United States Patent [19]
Morita

[11] Patent Number: 5,126,954
[45] Date of Patent: Jun. 30, 1992

[54] FUNCTION EXPANSION STATION FOR A PORTABLE COMPUTER

[75] Inventor: Seiji Morita, Yokohama, Japan

[73] Assignee: Sotec Company, Limited, Kanagawa, Japan

[21] Appl. No.: 621,050

[22] Filed: Nov. 29, 1990

[30] Foreign Application Priority Data

Apr. 18, 1990 [JP] Japan .................................. 2-102373

[51] Int. Cl.⁵ .......................... G06F 1/00; H05K 5/00
[52] U.S. Cl. ..................................... 364/708; 361/394
[58] Field of Search ................. 364/708; 361/394, 390, 361/391, 397, 399, 412, 414, 415

[56] References Cited

U.S. PATENT DOCUMENTS

4,769,764 9/1988 Levanon .............................. 364/708
4,903,222 2/1990 Carter et al. ......................... 364/708

Primary Examiner—Long T. Nguyen
Attorney, Agent, or Firm—Koda and Androlia

[57] ABSTRACT

A station is connected to a portable computer to expand various functions of the computer. The portable computer is unitedly and fixedly mounted in the station so that the portable computer can be used as a desk top type computer. A slot board for expanding the functions of the portable computer is not fixed and is detachably mounted in the station. Further, various kinds of slot boards having different function and length are provided and can be exchanged freely it the need arises.

1 Claim, 7 Drawing Sheets

FUNCTION EXPANSION STATION FOR A PORTABLE COMPUTER

BACKGROUND OF THE INVENTION

1. Field of the Invention

The present invention relates to a function expansion station for a portable computer used to expand functions of the portable computer in the same manner as a desk top type computer.

2. Description of the Prior Arts

Recently, a portable computer having a liquid crystal type display screen movable to be opened and closed with respect to a computer body is spread remarkably. Such a portable computer is small and thin in consideration to the convenience of portability and accordingly the functions thereof is far inferior as compared with the desk top type computer.

Thus, in recent, in order to attain the high function, the portable computer which can increase a slot board for the function expansion in the computer body comes on to the market. However, increase of the single slot board is the limit in order to maintain the size of the portable computer to the extent that the convenience of the portability which is a mission of the portable computer is not reduced. Thus, there is a limit for expansion of the function of the conventional portable computer.

On the other hand, the desk top type computer can increase slot boards, while it is necessary to remove a body cover of the computer when the slot boards are mounted and accordingly the increase operation of the slot board is difficult and troublesome.

SUMMARY OF THE INVENTION

It is an object of the present invention to solve the problems in the prior art at a stroke and to provide a function expansion station for a portable computer which can integrally use as a desk top type computer having high functions by a simple connection operation and can easily increase and change various slot boards for function expansion having different functions and sizes.

In order to achieve the above object, according the present invention, a station connected to a portable computer for expanding various functions of the computer comprises:

a receiving plane for receiving the portable computer unitedly when the portable computer is connected;

a fixing device for fixing the portable computer in the receiving plane;

a slot board mounting board for defining an inside of the station into at least two rooms and capable of being electrically connected to the portable computer;

board accommodating rooms defined by the slot board mounting board and capable of accommodating various kinds of slot boards having different length for expanding functions of the portable computer;

slot board connectors provided in the slot board mounting boards so that a connection portion is directed to the board accommodating room and for detachably mounting the various kinds of slot boards; and openings for inserting the slot boards into each of the board accommodating rooms.

With the station as configured above, the portable computer can be easily connected and united with the station and can be used as the desk top type computer. Furthermore, various kinds of function expansion slot boards having different functions and sizes can be increased and changed freely.

DETAILED DESCRIPTION OF THE INVENTION

Figure 1:
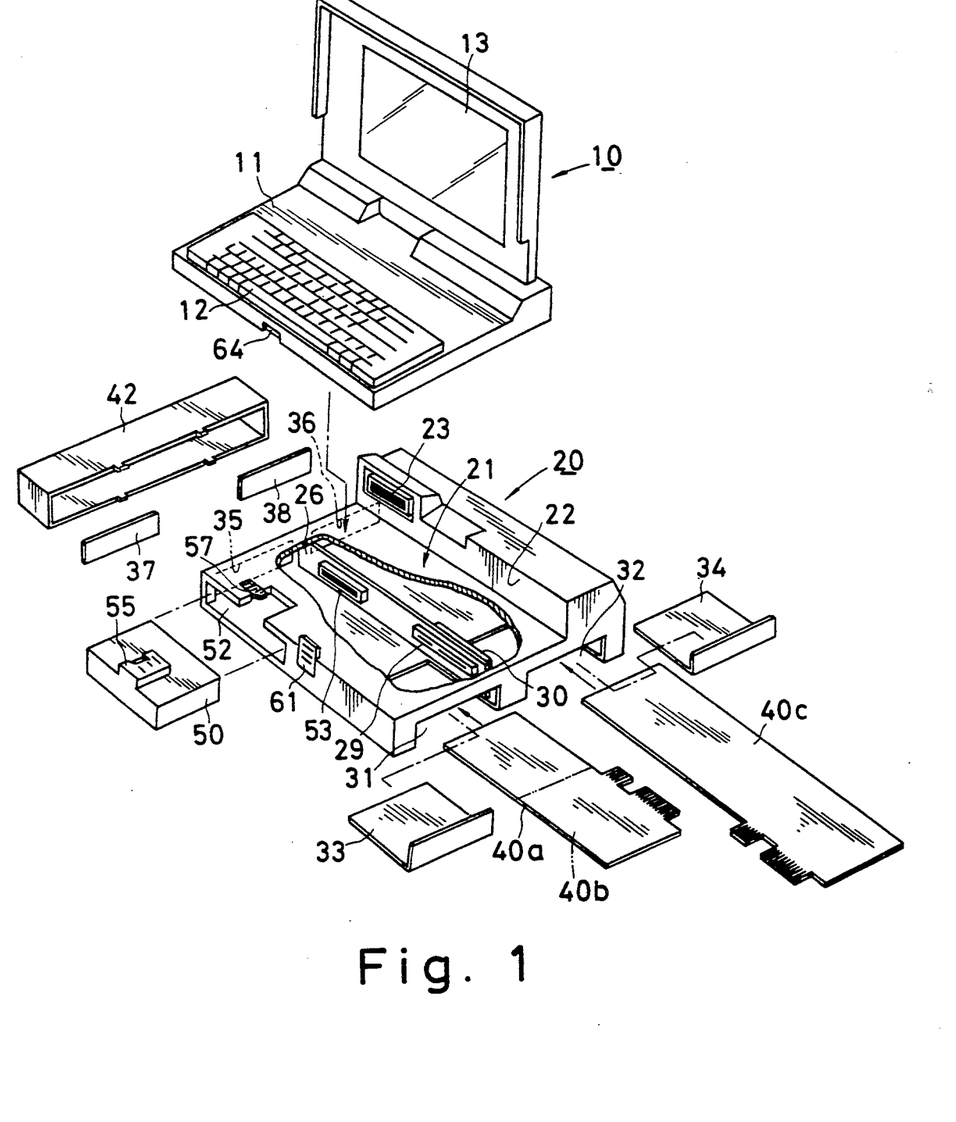
FIG. 1 is a partially broken exploded perspective view showing a function expansion station according to an embodiment of the present invention together with a portable computer.
Figure 12:
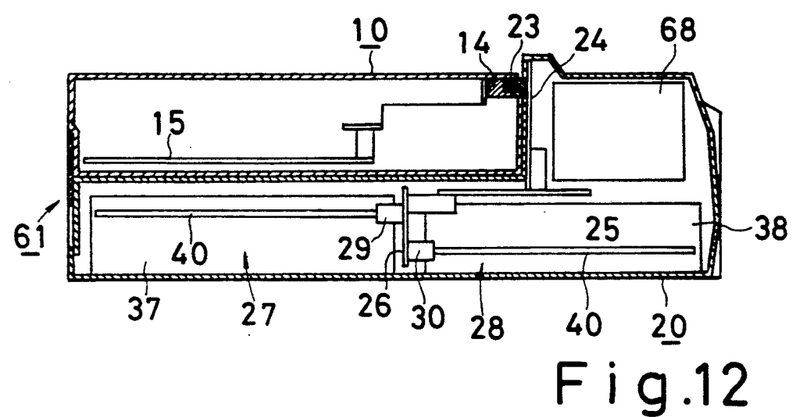
FIG. 12 is a sectional view showing the station of the present invention mounted to the portable computer.

A portable computer 10 includes a key board 12 mounted to a computer body 11 and further includes devices necessary for drive such as, for example, a hard disk drive not shown and a CPU board 15 (refer to FIG. 12). The computer body 11 is provided with a display screen 13 angularly moved to be opened and closed, and a female connector 14 (refer to FIG. 12) having a connection portion directed backward is mounted in the vicinity of the center of the angular movement portion of the display screen 13. The female connector 14 is connected to the CPU board 15 mounted within the computer body 11.

A station 20 serves to expand the function of the portable computer 10 so that the portable computer has the same functions as those of a desk top type computer and is provided with a computer receiving plane 21 having an upper portion for receiving the portable computer 10 to unite the computer 10 therewith. The receiving plane 21 has a width and a depth formed in the same sizes as those of the portable computer 10. The receiving plane 21 includes a wall 22 having a height corresponding to a thickness of the portable computer 10 and a male connector 23 is mounted in the wall 22 with a connection portion of the male connector 23 being directed forward. The male connector 23 is positioned to be aligned with the female connector 14 of the portable computer 10 when the portable computer 10 is placed on the receiving plane 21 without any positional deviation and can be detachably inserted into the female connector 14. Further, the male connector 23 is connected to a board mounting board 26 through intermediate boards 24 and 25 (refer to FIG. 12) in the station 20. Accordingly, when the female connector 14 is connected to the male connector 23, the computer body 11 is electrically connected to the board mounting board 26 through the intermediate boards 24 and 25.

Figure 3:
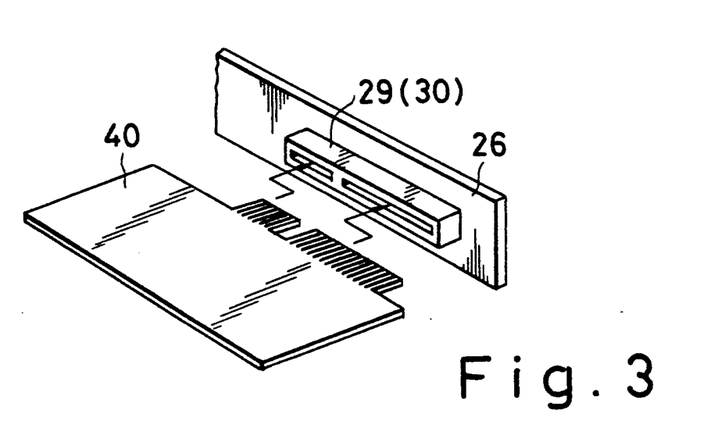
FIG. 3 is an exploded perspective view of a slot board and a connector connected to the slot board.

The board mounting board 26 is fixedly mounted in the substantially center portion of the station 20 to divide the station 20 into two sections so that a front board accommodating room 27 and a rear board accommodating room 28 for accommodating various slot boards 40 described later are defined (refer to FIG. 12). Board connectors 29 and 30 are fixedly mounted back to back on both sides of the board mounting board 26 with connection portions thereof directed to the front board accommodating room 27 and the rear board accommodating room 28, respectively. As shown in FIG. 3, the connection portions of the board connectors 29 and 30 is formed into two large and small slit-like insertion inlets, which are detachably fitted onto two terminals 41 of a slot board 40 corresponding thereto, and insertion of the terminals 41 into the insertion inlets connect the board connector 29 and the slot board 40.

Board insertion openings 31 and 32 are formed in the sides of the station 20 corresponding to the front board accommodating room 27 and the rear board accommodating room 28 so that the slot boards 40 are inserted into the board accommodating rooms 27 and 28 through the board insertion openings 31 and 32, respectively, and removable side lids 33 and 34 are provided in the board insertion openings 31 and 32, respectively. Further, board evasion windows 35 and 36 are formed in the other sides of the station 20 opposite to the board insertion openings 31 and 32 and evasion window opening lids 37 and 38 are detachably disposed in the board evasion windows 35 and 36.

Figure 2A:
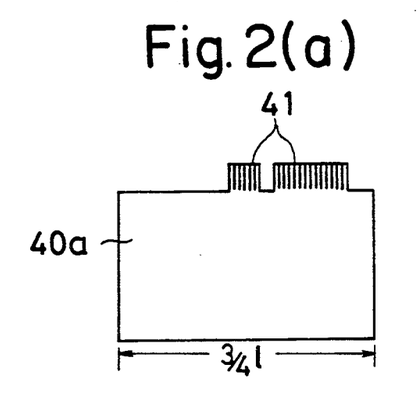
FIGS. 2(a), 2(b), 2(c) are plan views of various slot boards having different sizes used in the station of the present invention.
Figure 2B:
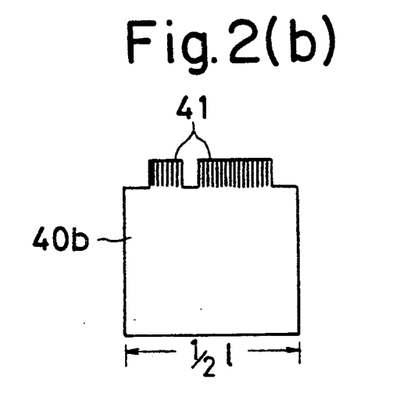
Figure 2C:
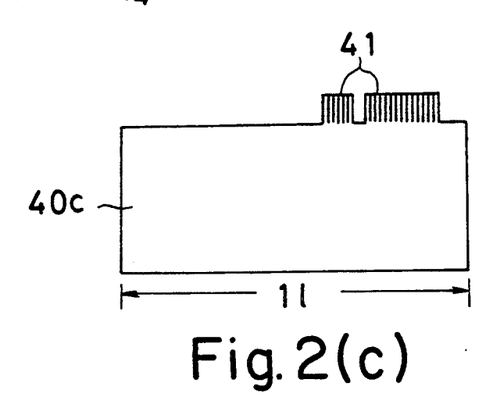

A length of the slot board 40 which is accommodated into the board accommodating rooms 27 and 28 and is fitted into the board connectors 29 and 30 is different depending on a function thereof (for example, memory increase function, modem increase function, communication function, graphic function or the like). In the present invention, there are three kinds of boards shown in FIG. 2. FIG. 2(c) shows a full-size slot board 40c having a length of 1 l which partially protrudes from the front and rear board accommodating rooms 27 and 28 through the board evasion windows 35 and 36. FIG. 2(a) shows a normal-size slot board 40a having a length of 4/3 l of the full-size slot board 40c which is accommodated in the front and rear board accommodating rooms 27 and 28. FIG. 2(b) shows a half-size slot board 40b having a length of ½ l of the full-size slot board 40c.

The full-size slot board 40c partially protrudes out of the station 20 when the board 40c ia accommodated in the front and rear board accommodating rooms 27 and 28. In order to cover the protruded portion of the full-size slot board 40c and close the board evasion windows 35 and 36 simultaneously, a cover 42 is detachably mounted for the station 20.

Figure 4:
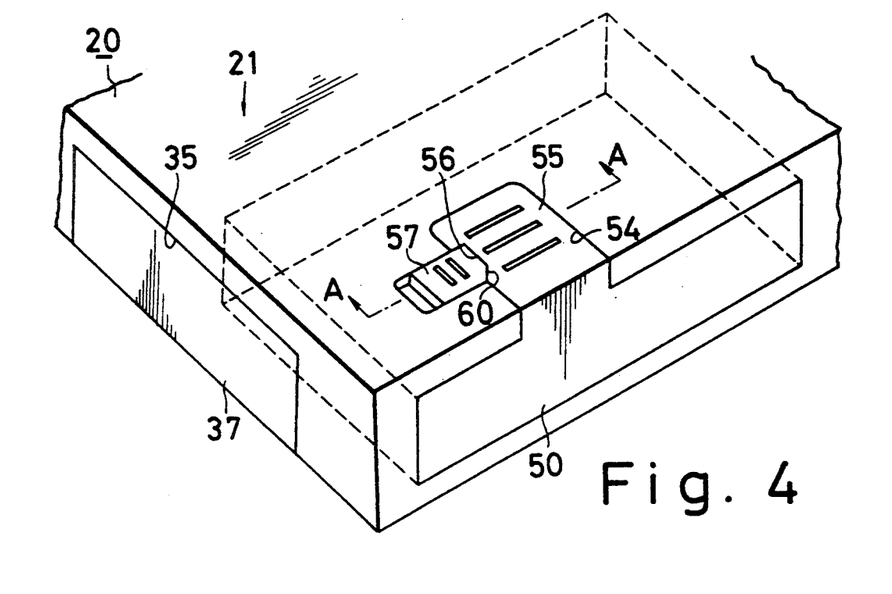
FIG. 4 is a perspective view of a hard disk unit constituting a configuration of the present invention and which is mounted in the station.
Figure 5:
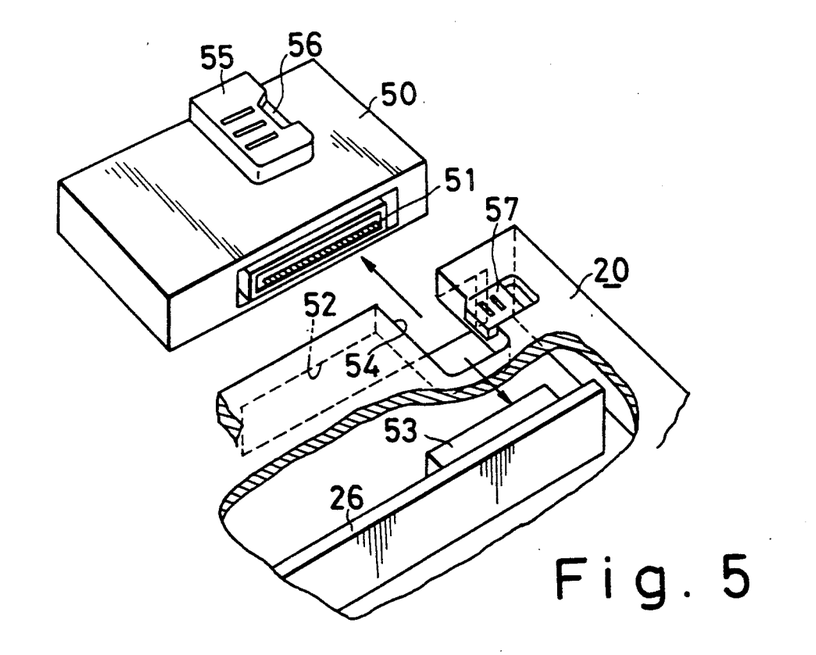
FIG. 5 is a partially broken exploded perspective view showing the hard disk unit and a station receiving the hard disk unit.
Figure 6:
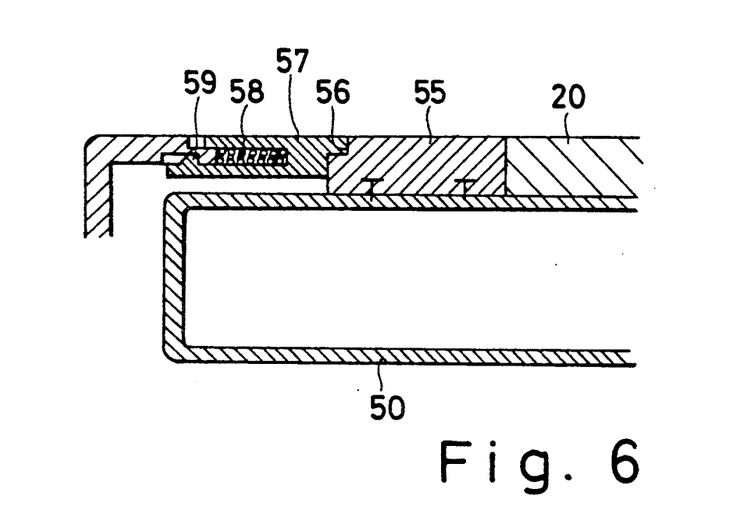
FIG. 6 is a sectional view taken along line A—A of FIG. 4.

Part of the board accommodating room 27 constitutes an increase space for a hard disk unit 50 in addition to the function of accommodating the slot board. The hard disk unit 50 is used when the portable computer 10 requires a memory capacity exceeding that of an internal hard disk drive (HDD) provided within the portable computer 10, and the hard disk unit 50 includes a HDD for increase not shown disposed within the unit 50 and a connector disposed in a front portion thereof. Thus, an opening 52 is formed in the front side of the station 20 so that the hard disk unit 50 is inserted into the increase space constituting the part of the front board accommodating room 27 through the opening 52. The board mounting board 26 extends to the inner part of the opening and a connector 53 for HDD is fixedly mounted to the board mounting board 26 with a connection portion of the connector 53 being directed to the front board accommodating room 27. The connector 53 for HDD can be detachably inserted into the connector 51 of the hard disk unit 50. Further, a finger knob 55 is mounted on the hard disk unit 50 so that the finger knob 55 is projected to be engaged with a notch guide 54 formed in the receiving plane 21, and an engagement recess 56 is formed in one side of the finger knob 55.

In order to mount the hard disk unit 50 in the increased space of the front board accommodating room 27 if the need arises and lock the hard disk unit 50 in the station 20 during use, a lock key 57 is mounted in the receiving plane 21 slidably toward the notch guide 54. The lock key 57 can be engaged with the engagement recess 56 of the hard disk unit 50 and is always urged to be moved toward the notch guide 54, that is, in the lock direction to be engaged with the engagement recess 56 when the hard disk unit 50 is mounted in the increased space. Further, numeral 59 denotes a stopper for restricting movement of the lock key in the lock direction, and 60 an inclined plane for pushing back the lock key 57 in the unlock direction by the finger knob 55 on the way of mounting of the hard disk unit 50.

Figure 13:
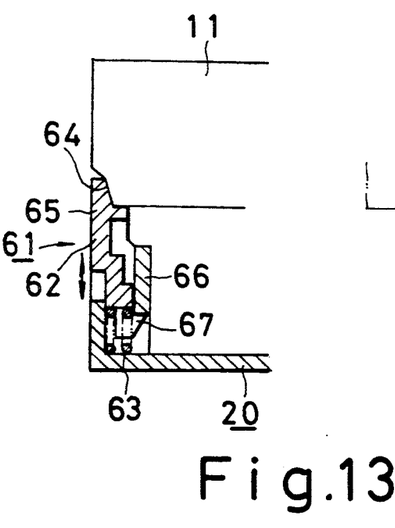
FIG. 13 is a sectional view of a fixing device constituting the present invention.
Figure 14:
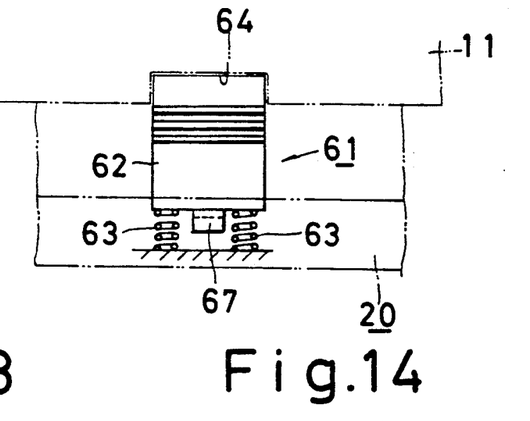
FIG. 14 is a front view of a slide latch constituting the fixing device.

A fixing device 61 is disposed in a front center of the station 20 adjacent to the opening 52. The fixing device 61 is to fix and unite the portable computer placed on the receiving plane 21 in the station 20, and as shown in FIGS. 13 and 14, the fixing device 61 includes a vertically movable slide latch 62 and a compression spring 63 for urging to move the slide latch 62 upward. The slide latch 62 includes a fixing nail 65 capable of being engaged with an engagement recess 64 formed in the computer body 11 and the fixing nail 65 is urged to be moved upward, that is, in the direction of engagement with the engagement recess 64 by the compression spring 63. Further, a detachment preventing nail 67 which can be engaged with a stopper 66 on the side of the station 20 is formed under the slide latch 62.

Figure 7:
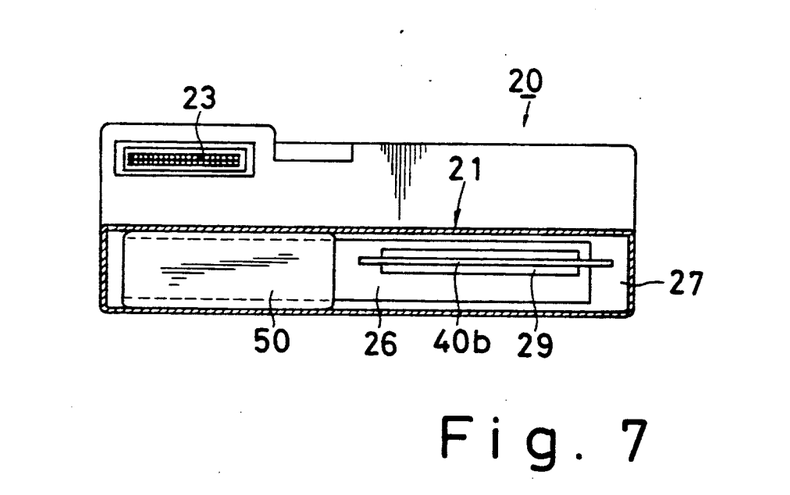
FIG. 7 is a sectional view showing a slot board and the hard disk unit mounted to the station.

Accordingly, when the memory capacity exceeding that of the the portable computer is provided in the portable computer and the function of the portable computer is to be further expanded, the half-size slot board 40b and the normal-size slot board 40a are used as the slot board 40 while the hard disk unit 50 is mounted in the station 20. Since the partial space of the front board accommodating room 27 is occupied by the hard disk unit 50, the front board accommodating room 27 can accommodate only the half-size slot board 40b. Thus, the side lid 33 is removed and the half-size slot board 40b is inserted from the board insertion opening 31 to insert the terminal portion 41 into the connection portion of the board connector 29 so that the half-size slot board 40b is connected to the board connector 29. Then, the side lid 33 is closed. This state is shown in FIG. 7. Further, the rear board accommodating room 28 can accommodate the normal-size slot board 40a and the half-size slot size 40b. In order to connect the normal-size slot board 40a to the board connector 30, the side lid 34 is removed and the normal-size slot board 40a is inserted from the opening 32. Then, the terminal portion 41 of the normal-size slot board 40a is pushed into the board connector 30. Connection of the half-size slot board 40 to the board connector 30 is made by the same procedure. It is a matter of course that the side lids 33 and 34 are closed after mounting of the normal-size slot board 40a and the half-size slot board 40b.

Figure 8:
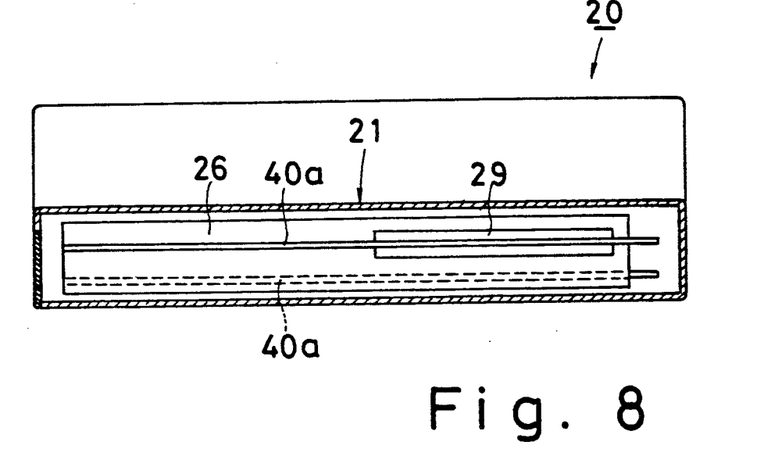
FIG. 8 is a sectional view showing a normal-size slot board mounted to the station.

Then, when two normal-size slot boards 40a are inserted into the front and rear board accommodating rooms 27 and 28 to connect them to the board connectors 29 and 30, respectively, the hard disk unit 50 mounted in the space of the front board accommodating room 27 stands in the way. Thus, it is necessary to remove the hard disk unit 50 from the station 20. For this purpose, the lock key 57 is pushed back in the unlock direction against the force of the compression spring 58 to remove the engagement with the engagement recess 56 and the finger knob 55 is pulled to this side. Thus, the hard disk unit 50 can be removed from the station 20 simply and the space for accommodating the normal-size slot boards 40a can be prepared in the front board accommodating room 27. In this state, the side lids are removed and the normal-size slot boards 40a are inserted from the openings 31 and 32, respectively. Then, the terminal portions 41 of the normal-size slot boards 40a are inserted into the connection portions of the board connectors 29 and 30 (FIG. 8). The side lids 33 and 34 are then closed. Further, it is a matter of course that the opening 52 opened after removal of the hard disk unit 50 is closed by a removable lid not shown.

Figure 9:
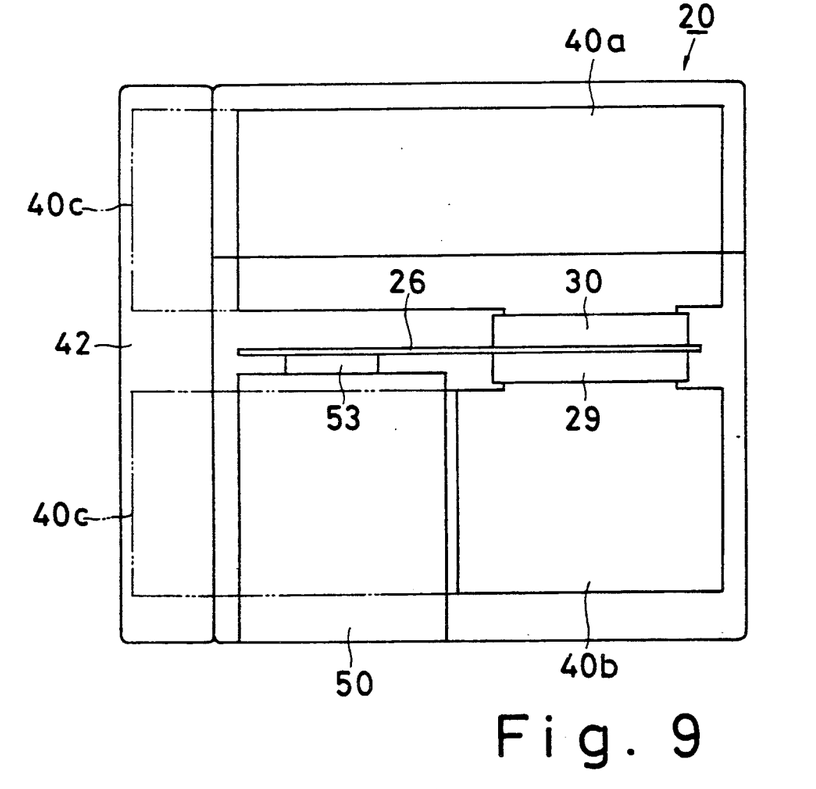
FIG. 9 is a perspective plan view showing a full-size slot board mounted to the station.
Figure 10:
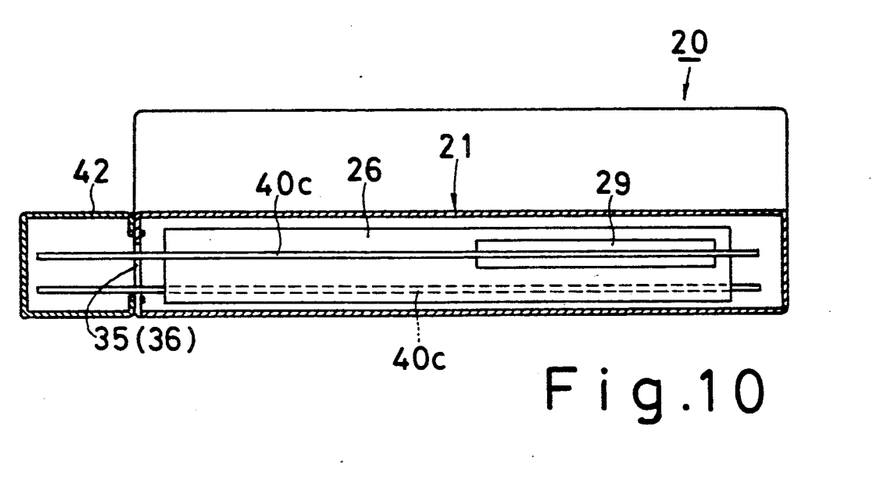
FIG. 10 is a sectional view of FIG. 9.
Figure 11:
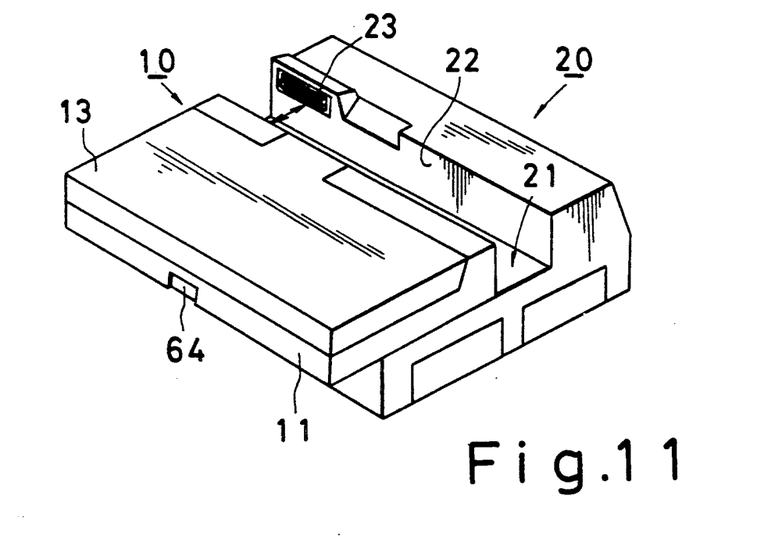
FIG. 11 is a perspective view showing the station of the present invention which is being mounted to the portable computer.

When the maximum expansion function is provided in the portable computer 10, two full-size slot boards 40a are used. The connection procedure of the two full-size slot boards 40c to the board connectors 29 and 30 is made according to the procedure of the normal-size slot board 40a. However, when the full-size slot boards 40c are mounted, parts of the boards 40c, that is, ends thereof are protruded out of the station 20. In order to put out the end of the full-size slot boards 40c from the station 20 by utilizing the board evasion windows 35 and 36, the evasion window opening lids 37 and 38 are previously removed. Thus, the full-size slot boards 40c are connected to the board connectors 29 and 30, respectively, in the state where the ends of the full-size slot boards 40c are protruded from the station 20 through the board evasion windows 35 and 36. If the cover 42 is mounted to the station 20 to cover the protruded portions, the cover 42 protects the protruded portions of the full-size slot boards 40c and also closes the board evasion openings 35 and 36 (refer to FIGS. 9 and 10).

In order to remove the slot board 40 from the station 20, the terminal portion 41 of the slot board 40 is pulled out and connection of the slot board 40 to the board connector 29 or 30 is removed.

Further, when the hard disk unit 50 is required in the portable computer 10, the finger knob 55 is aligned with the notch guide 54 and the hard disk unit 50 is inserted from the opening 52 and is further pushed therein. The end corner of the finger knob 55 is brought into contact with the inclined plane 60 to push back the lock key 57 against the force of the compression spring 58. When the engagement recess 56 faces the lock key 57, the lock key 57 is put into the engagement recess 56 by the compression spring 58. Thus, the hard disk unit 50 is locked in the station 20. At this time, the connector 51 is fitted into the connector 53 for HDD and the increased HDD provided within the hard disk unit 50 is electrically connected to the board mounting board 26.

As described above, the slot boards 40 and the hard disk unit 50 are increased and changed in the station 20.

Then, connection of the portable computer 10 to the station 20 having the function expansion and increased capacity as described above is described.

The connection between both of the computer 10 and the station 20 is extremely simple. That is, the portable computer 10 is placed on the receiving plane 21 of the station 20 to oppose the female connector 14 to the male connector 23 and the portable computer 10 is pushed in forward while the slide latch 62 is pushed down against the force of the compression spring 63. Consequently, the female connector 14 is fitted onto the male connector 23 and at the same time the slide latch 62 is moved upward, that is, in the engagement direction by the force of the compression spring 63 so that the fixing nail 65 is fitted into the fixing device 61 and the portable computer 10 is locked in the station 20. Thus, the portable computer 10 is united with the station 20 and is electrically connected to the slot board 40 and the hard disk unit 50 in the station 20. Accordingly, the portable computer 10 can be used as the disk top type compute and with the same various functions and recording capacity as those of the disk top type computer.

Drive of the station 20 is made by an internal power supply 68 and operation for the function expansion is made by the key board 12 of the portable computer 10.

What is claimed is:

1. A station connected to a portable computer to expand various functions of the portable computer, comprising:

a receiving plate for receiving the portable computer unitedly when the portable computer is connected;

a fixing device for fixing the portable computer in said receiving plate;

a slot board mounting board dividing an inside of said station into at least two board accommodating rooms and capable of being electrically connected to the portable computer, said board accommodating rooms defined by said slot board mounting board for accommodating various kinds of slot boards having different length for expanding functions of the portable computer, said various kinds of slot boards including a normal-size slot board having a length which is accommodated in said board accommodating room, a full-size slot board having a length which protrudes out of said board accommodating room, and a half-size slot board having a length of half of that of said full-size slot board and wherein one of said board accommodating rooms includes a space for accommodating a hard disk unit including a hard disk drive;

an engaging and disengagement means for engaging and disengaging said hard disk unit with said station;

slot board connectors provided in said slot board mounting board so that a connection portion is directed to the at least two board accommodating rooms for detachably mounting the various kinds of slot boards; and openings for inserting said slot boards into each of said board accommodating rooms.

* * * * *